United States Patent
Puiu et al.

(10) Patent No.: US 10,914,378 B2
(45) Date of Patent: Feb. 9, 2021

(54) ROLLER-GEAR SHIFT BY WIRE PARKING SYSTEM

(71) Applicant: GM Global Technology Operations LLC, Detroit, MI (US)

(72) Inventors: Dumitru Puiu, Sterling Heights, MI (US); Gurdeep Singh, Canton, MI (US); Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 51 days.

(21) Appl. No.: 16/405,477

(22) Filed: May 7, 2019

(65) Prior Publication Data
US 2020/0355267 A1    Nov. 12, 2020

(51) Int. Cl.
*F16H 63/34* (2006.01)
*F16D 63/00* (2006.01)
*F16H 63/06* (2006.01)

(52) U.S. Cl.
CPC ....... *F16H 63/3475* (2013.01); *F16D 63/006* (2013.01); *F16H 63/062* (2013.01); *F16H 63/3425* (2013.01); *F16H 63/3441* (2013.01); *F16H 63/3483* (2013.01)

(58) Field of Classification Search
CPC ............... F16H 63/3416–3491; F16H 55/10
See application file for complete search history.

(56) References Cited

U.S. PATENT DOCUMENTS

| | | | |
|---|---|---|---|
| 4,518,066 A | 5/1985 | Barr | |
| 6,290,047 B1 | 9/2001 | Adamczyk et al. | |
| 6,419,068 B1 | 7/2002 | Stephan et al. | |
| 6,983,668 B2 | 1/2006 | Powell et al. | |
| 7,075,023 B2 | 7/2006 | Kent et al. | |
| 7,204,785 B2 | 4/2007 | Berger et al. | |
| 7,284,648 B2 | 10/2007 | Reed et al. | |
| 7,757,832 B2 | 7/2010 | Sauter et al. | |
| 7,832,541 B2 | 11/2010 | Joshi et al. | |
| 7,963,882 B2 | 6/2011 | Nishimura | |
| 8,053,691 B2 | 11/2011 | Vernacchia et al. | |
| 8,950,563 B2 | 2/2015 | Kayukawa et al. | |
| 9,255,640 B1 | 2/2016 | Sten et al. | |
| 9,321,435 B2 | 4/2016 | Landino et al. | |
| 9,394,991 B2 | 7/2016 | Swaita et al. | |
| 9,435,428 B2 | 9/2016 | Neelakantan et al. | |
| 9,772,033 B2 | 9/2017 | McDonough et al. | |
| 9,777,836 B1 | 10/2017 | Lee et al. | |

(Continued)

*Primary Examiner* — David R Morris
(74) *Attorney, Agent, or Firm* — Quinn IP Law

(57) ABSTRACT

A shift by wire parking system includes a park gear including a gear body and a plurality of teeth. The teeth are circumferentially spaced from one another. The park gear defines a plurality of void spaces between each pair of the plurality of teeth. The shift by wire parking system includes a circumferential body sized to fit inside each of the plurality of void spaces to lock a position of the park gear. The circumferential body is movable towards and away from the park gear between an engaged position and a disengaged position. In the disengaged position, the circumferential body is disposed outside each of the plurality of void spaces, thereby allowing the park gear to rotate. In the engaged position, the circumferential body is disposed inside one of the void spaces to lock the position of the park gear.

17 Claims, 6 Drawing Sheets

(56) References Cited

U.S. PATENT DOCUMENTS

| | | | |
|---|---|---|---|
| 9,869,389 B2 | 1/2018 | Rhoades et al. | |
| 10,132,408 B2 | 11/2018 | Singh et al. | |
| 10,161,518 B2 | 12/2018 | Neelakantan et al. | |
| 10,648,560 B2 * | 5/2020 | Kokubu | B60T 1/062 |
| 2004/0245079 A1 * | 12/2004 | Kent | H01R 13/7035 |
| | | | 200/276.1 |
| 2004/0248687 A1 * | 12/2004 | Powell | F16H 63/48 |
| | | | 475/132 |
| 2005/0143220 A1 * | 6/2005 | Berger | B60W 30/18054 |
| | | | 477/96 |
| 2005/0205384 A1 * | 9/2005 | Reed | F16H 63/3425 |
| | | | 192/219.5 |
| 2008/0127772 A1 * | 6/2008 | Sauter | F16H 63/3416 |
| | | | 74/575 |
| 2008/0264190 A1 * | 10/2008 | Nishimura | F16H 63/3458 |
| | | | 74/335 |
| 2009/0158877 A1 * | 6/2009 | Vernacchia | F16H 63/3475 |
| | | | 74/473.24 |
| 2009/0173594 A1 * | 7/2009 | Joshi | F16H 63/3416 |
| | | | 192/219.5 |
| 2010/0108460 A1 * | 5/2010 | Nakamura | F16H 63/3416 |
| | | | 192/219.5 |
| 2014/0123799 A1 * | 5/2014 | Landino | B60T 1/062 |
| | | | 74/473.11 |
| 2014/0231212 A1 * | 8/2014 | Kayukawa | F16H 63/3433 |
| | | | 192/219.4 |
| 2015/0143938 A1 * | 5/2015 | Swaita | F16H 61/22 |
| | | | 74/473.12 |
| 2016/0033037 A1 * | 2/2016 | Rhoades | F16H 63/3466 |
| | | | 74/411.5 |
| 2016/0061324 A1 * | 3/2016 | Sten | F16H 63/3433 |
| | | | 192/219.5 |
| 2016/0069451 A1 * | 3/2016 | McDonough | F16H 63/483 |
| | | | 74/473.11 |
| 2016/0169375 A1 * | 6/2016 | Neelakantan | F16H 61/0267 |
| | | | 74/473.11 |
| 2016/0208916 A1 | 7/2016 | Kokubu et al. | |
| 2018/0051804 A1 * | 2/2018 | Singh | B60T 1/005 |
| 2018/0100581 A1 * | 4/2018 | Neelakantan | F16H 63/3466 |
| 2018/0112774 A1 | 4/2018 | Littlefield et al. | |
| 2019/0264807 A1 * | 8/2019 | Kimura | F16H 63/3425 |

\* cited by examiner

ROLLER-GEAR SHIFT BY WIRE PARKING SYSTEM

INTRODUCTION

The present disclosure relates to a shift by wire parking system and, more specifically, to roller-gear shift by wire parking system.

SUMMARY

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Some automatic transmissions include a hydraulic control system that is employed to provide cooling and lubrication to components within the transmission and to actuate a plurality of torque transmitting devices. These torque transmitting devices may be, for example, friction clutches and brakes arranged with gear sets or in a torque converter. The hydraulic control system may include a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to various subsystems including lubrication subsystems, cooler subsystems, torque converter clutch control subsystems, and shift actuator subsystems that include actuators that engage the torque transmitting devices. The pressurized hydraulic fluid delivered to the shift actuators is used to engage or disengage the torque transmitting devices in order to obtain different gear ratios.

The transmission generally operates in a plurality of modes of operation including out-of-Park driving modes and a Park mode. The out-of-Park driving modes generally include the forward gear or speed ratios (i.e., a Drive mode), at least one reverse gear or speed ratio (i.e. a Reverse mode), and a Neutral mode. Selection of the various driving modes is sometimes accomplished by engaging a shift lever or other driver interface device that is connected by a shifting cable or other mechanical connection to the transmission.

Alternatively, the selection of a driving mode may be controlled by an electronic transmission range selection (ETRS) system, also known as a "shift by wire" system. In an ETRS system, selection of the driving modes is accomplished through electronic signals communicated between the driver interface device and the transmission. The ETRS system reduces mechanical components, increases instrument panel space, enhances styling options, and eliminates the possibility of shifting cable misalignment with transmission range selection levers. New propulsion system architectures may no longer rely upon clutches and, thus, may no longer incorporate a hydraulic control system.

These control systems must meet specific some requirements for new transmission and vehicle designs during particular failure modes of operation. In the absence or reduced availability of hydraulic systems in these new propulsion system architectures, these requirements are sometimes met by mounting a system external to the housing of the transmission. A shaft may extend out of the transmission housing and is connected to this external system. This external system must provide several features including: defaulting to park in a complete power loss situation; maintaining an out-of-park configuration when desired despite a single element failure; and maintaining the motive ability to move between the out-of-park configuration and park configuration and vice-versa on command. Since this external component is required to provide all of the features, the external component sometimes includes electromechanical actuators with motors, sensors, controllers, etc. This external system is bulky, complex with several components, and is quite expensive.

The present disclosure describes a shift by wire parking system having a "roller parking gear" mechanism instead of the conventional "pawl gear" system. The system is actuated to the out of park position by an electromechanical actuator and held in out of park (OOP) by a combination of a latching solenoid and the electrical actuator. Returning back to park position is achieved by the function of the default to park return spring and the electric actuator.

In one aspect of the present disclosure a shift by wire parking system includes a park gear including a gear body and a plurality of teeth protruding from the gear body. The plurality of teeth is circumferentially spaced from one another. The park gear defines a plurality of void spaces between each pair of the plurality of teeth. The shift by wire parking system includes a circumferential body sized to fit inside each of the plurality of void spaces to lock a position of the park gear. The circumferential body is movable towards and away from the park gear between an engaged position and a disengaged position. In the disengaged position, the circumferential body is disposed outside each of the plurality of void spaces, thereby allowing the park gear to rotate. In the engaged position, the circumferential body is disposed inside one of the plurality of void spaces to lock the position of the park gear. The shift by wire parking system may further include a rotatable plate and an intermediate roller rotatably coupled to the rotatable plate to allow the intermediate roller to rotate relative to the rotatable plate. The intermediate roller is configured to contact the circumferential body to allow a rotation of the circumferential body to cause the intermediate roller to rotate. The rotatable plate is configured to rotate to allow the intermediate roller to move towards and away from the park gear. The intermediate roller is a first intermediate roller, and the shift by wire system may further include a second intermediate roller rotatably coupled to the rotatable plate to allow the second intermediate roller to rotate relative to the rotatable plate.

The shift by wire parking system may further include an engagement pin directly coupled to the circumferential body. The engagement pin is movable between a locked pin position and an unlocked pin position. Moving the engagement pin from unlocked pin position to the locked pin position causes the first intermediate roller to move toward the park gear, thereby moving the circumferential body to the engaged position to lock the position of the park gear.

The shift by wire parking system may further include a lever in direct contact with the engagement pin, wherein the lever is movable between an unlocked lever position and a locked lever position. Moving the lever from the unlocked lever position to the locked lever position causes the engagement pin to move from the unlocked pin position to the locked position.

The shift by wire parking system may further include a park spring in direct contact with the engagement pin to bias the engagement pin towards the locked pin position. Moving the lever from the locked lever position toward the unlocked lever position compresses the park spring. The shift by wire parking system may further include an assembly housing defining a cavity. The rotatable plate, the first intermediate roller, and the second intermediate roller may be entirely disposed inside the cavity of the assembly housing when the circumferential body is in the disengaged position, the circumferential body is partially disposed outside the cavity when disposed in the engaged position. The assembly housing defines an arc-shaped slot, the engagement pin is partially disposed inside the arc-shaped slot, the arc-shaped slot is configured to guide a movement of the engagement pin between the unlocked pin position and the locked pin position, thereby allowing the engagement pin to move along an arc trajectory between the unlocked pin position and the locked pin position. The shift by wire parking system may further include a movable pin directly coupled to the circumferential body. The assembly housing defines an elongated slot. The movable pin is partially disposed inside the elongated slot to allow the circumferential body to move linearly toward and away from the park gear between the disengaged position and the engaged position.

The shift by wire parking system may further include an actuator coupled to the lever to move the lever between the unlocked lever position and the locked lever position. The circumferential body may be an engagement roller configured to rotate along the plurality of teeth of the park gear. The circumferential body may be a ball configured to rotate along the plurality of teeth of the park gear.

The shift by wire parking system may further include an actuation assembly, and the actuation assembly includes an actuator guide defining a cavity, and an actuator rod partly disposed inside the cavity. The actuator rod is configured to translate along the cavity, and the actuator rod defines a first rod end and a second rod end opposite the first rod end. The actuation assembly further includes a roller support coupled at the second rod end, wherein the roller support is disposed in the cavity of the actuator guide. The roller support is configured to translate through the cavity of the actuator guide upon translation of the actuator rod. The actuation assembly further includes a driving roller coupled to the roller support. The driving roller is configured to translate through the cavity of the actuator guide upon translation of the roller support. The actuation assembly further includes a ramp pivotally coupled to the actuator guide inside the cavity. The ramp is configured to pivot to push the circumferential body from the disengaged position toward the engaged position upon translation of the actuator rod, the roller support, and the driving roller through the cavity of the actuator guide. The actuator guide may have a front wall and a rear wall opposite the front wall, the shift by wire parking system further includes a rod spring mounted on the actuator rod between the rear wall of the actuator guide and the roller support to bias the roller support toward the circumferential body.

The shift by wire parking system may further include a detent plate coupled to the actuator rod. The detent plate defines a first notch and a second notch spaced apart from each other. The shift by wire parking system may further include a latching solenoid including a solenoid housing and solenoid shaft linearly movable relative to the solenoid housing between a retracted position and the extended position. The solenoid shaft is configured to move toward and away from the detent plate. The solenoid shaft is partly disposed inside the first notch to lock the circumferential body in the engaged position. The solenoid shaft is partly disposed inside the second notch to lock the circumferential body in the disengaged position.

The present disclosure also describes a vehicle system having a prime mover and a transmission. The transmission includes a transmission housing, a transmission input shaft disposed inside the housing, a transmission output shaft disposed inside the transmission housing, and a shift by wire parking system (as described above) disposed inside the transmission housing. The transmission input shaft is coupled to the prime mover.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

The following detailed description is merely exemplary in nature and is not intended to limit the application and uses. Furthermore, there is no intention to be bound by expressed or implied theory presented in the preceding introduction, summary or the following detailed description.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

Figure 1:
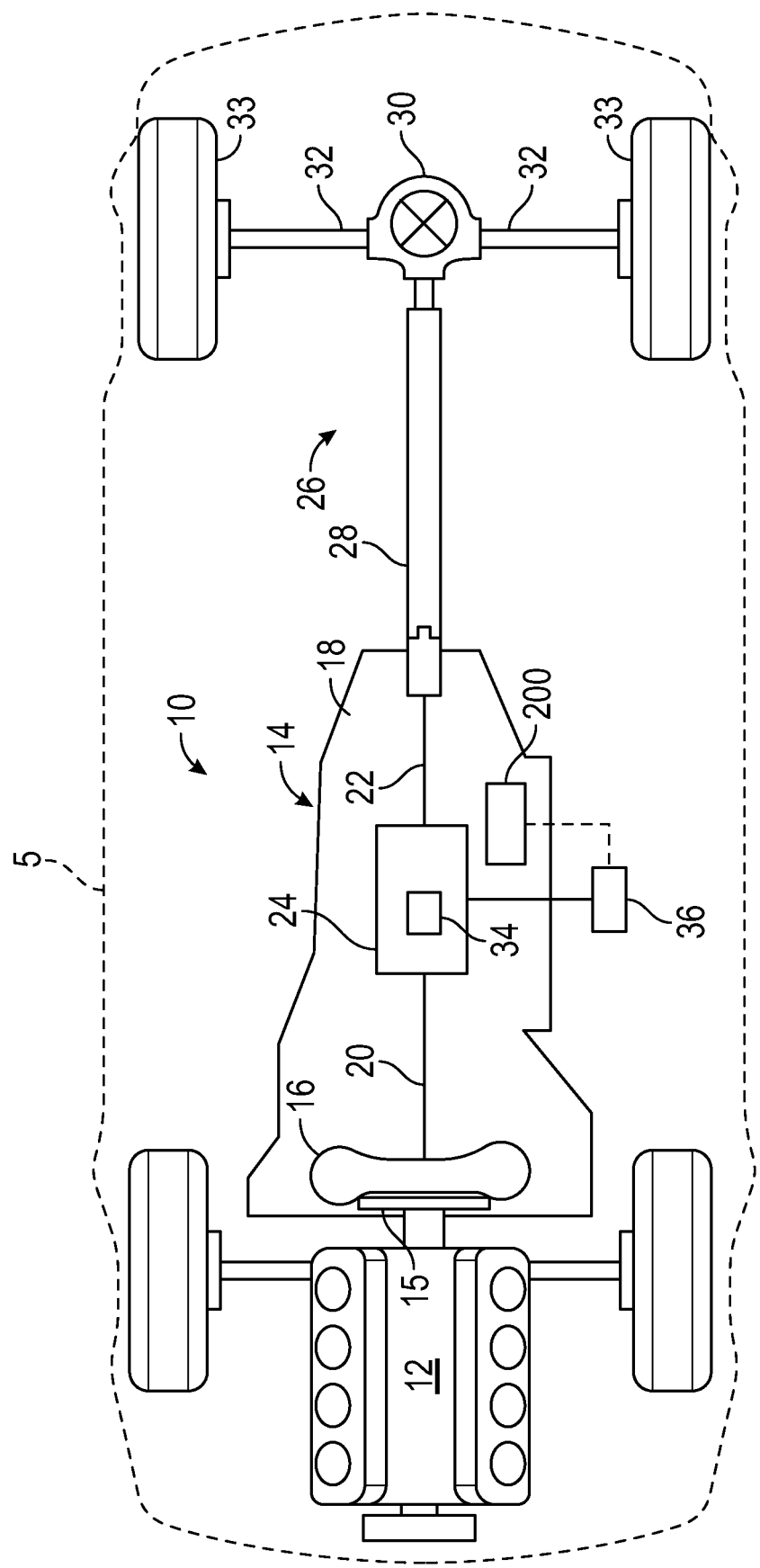
FIG. 1 is a schematic view of a vehicle system.

With reference to FIG. 1, a vehicle system is illustrated and generally indicated by reference number 5. The vehicle system 5 is illustrated as a passenger car, but it should be appreciated that the vehicle system 5 may be another type of vehicle, such as a truck, van, sport-utility vehicle, etc. The vehicle system 5 includes an exemplary propulsion system 10. It should be appreciated that at the outset that while a rear-wheel drive propulsion system 10 has been illustrated, the vehicle system 5 may have a front-wheel drive propulsion system. The propulsion system 10 generally includes a prime mover 12 coupled with a transmission 14.

The prime mover 12 may be an internal combustion engine and/or an electric motor, hybrid engine, or another type of prime mover. The prime mover 12 may supply a driving torque to the transmission 14 through a flex plate 15 or other connecting device that is connected to a starting device 16. The starting device 16 may be a hydrodynamic device, such as a fluid coupling or torque converter, a wet dual clutch, or an electric motor. It should be appreciated that other types of starting devices between the prime mover 12 and the transmission 14 may be employed including a dry launch clutch.

The transmission 14 may include a transmission housing 18 that encloses and protects the various components of the transmission 14. The transmission housing 18 may include a variety of apertures, passageways, shoulders and flanges which position and support these components. Generally speaking, the transmission 14 includes a transmission input shaft 20 and a transmission output shaft 22. The transmission input shaft 20 is functionally interconnected with the prime mover 12 via the starting device 16 and receives input torque or power from the prime mover 12. Accordingly, the transmission input shaft 20 may be a turbine shaft in the case where the starting device 16 is a hydrodynamic device, dual input shafts where the starting device 16 is dual clutch, or a drive shaft where the starting device 16 is an electric motor. The transmission output shaft 22 may be connected with a final drive unit 26 which includes, for example, a prop shaft 28, differential 30, and drive axles 32 connected to wheels 33.

The gear and clutch arrangement 24 includes a plurality of gear sets, a plurality of clutches and/or brakes, and a plurality of shafts. The plurality of gear sets may include individual intermeshing gears, such as planetary gear sets, that are connected to or selectively connectable to the plurality of shafts through the selective actuation of the plurality of clutches/brakes. The plurality of shafts may include lay shafts or countershafts, sleeve and center shafts, reverse or idle shafts, or combinations thereof. The clutches/brakes, indicated schematically by reference number 34, are selectively engageable to initiate at least one of a plurality of gear or speed ratios by selectively coupling individual gears within the plurality of gear sets to the plurality of shafts. It should be appreciated that the specific arrangement and number of the gear sets, clutches/brakes 34, and shafts within the transmission 14 may vary without departing from the scope of the present disclosure.

The transmission 14 includes a transmission control module 36. The transmission control module 36 may be an electronic control device, such as a controller, having a preprogrammed digital computer or processor, control logic or circuits, memory used to store data, and at least one I/O peripheral. The control logic includes or enables a plurality of logic routines for monitoring, manipulating, and generating data and control signals. In another example, the transmission control module 36 is an engine control module (ECM), or a hybrid control module, or another type of controller.

The transmission control module 36 may include at least one processor and a non-transitory computer readable storage device or media. The processor may be a custom made or commercially available processor, a central processing unit (CPU), a graphics processing unit (GPU), an auxiliary processor among several processors associated with the transmission control module 36, a semiconductor-based microprocessor (in the form of a microchip or chip set), a macroprocessor, a combination thereof, or generally a device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using a number of known memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the transmission control module 36 in controlling the transmission 14.

The instructions may include one or more separate programs, each of which comprises an ordered listing of executable instructions for implementing logical functions. The instructions, when executed by the processor of the transmission control module 36, receive and process signals from input devices, perform logic, calculations, methods and/or algorithms for automatically controlling the transmission 14, and generate control signals to automatically control the transmission 14 based on the logic, calculations, methods, and/or algorithms. Although a single transmission control module 36 is shown in FIG. 1, embodiments of the transmission 14 may include a plurality of transmission control modules 36 that communicate over a suitable communication medium or a combination of communication mediums and that cooperate to process the sensor signals, perform logic, calculations, methods, and/or algorithms, and generate control signals to automatically control the transmission 14. Accordingly, the transmission control module 36 is in electronic communication with the transmission 14. FIG. 1 also shows a schematic representation of a shift by wire parking system 200 positioned within the transmission housing 18 and in electronic communication with the transmission control module 36.

With reference to FIGS. 2-5, the shift by wire parking system 200 includes a park gear 202. The park gear 202 is configured to rotate about a gear axis XG in the direction indicated by arrow RG. The park gear 202 includes a gear body 204 and a plurality of teeth 206 protruding directly from the gear body 204. The teeth 206 are circumferentially spaced from one another. The park gear 202 defines a plurality of void spaces 208 between each pair of teeth 206.

Figure 2:
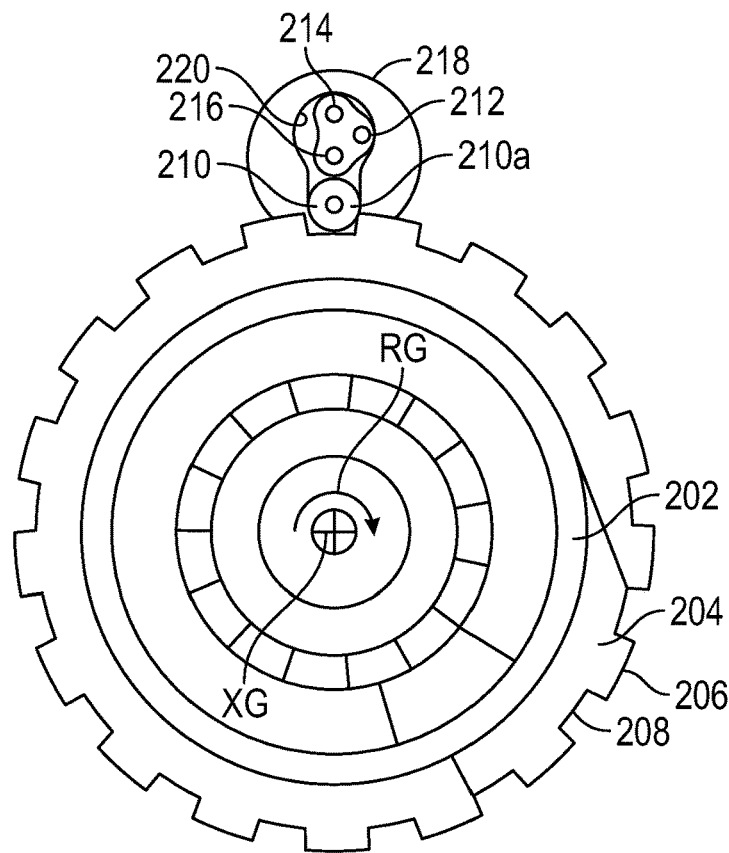
FIG. 2 is a schematic front view of a shift by wire parking system of the vehicle system shown in FIG. 1, wherein the shift by wire system is in a park position.
Figure 3:
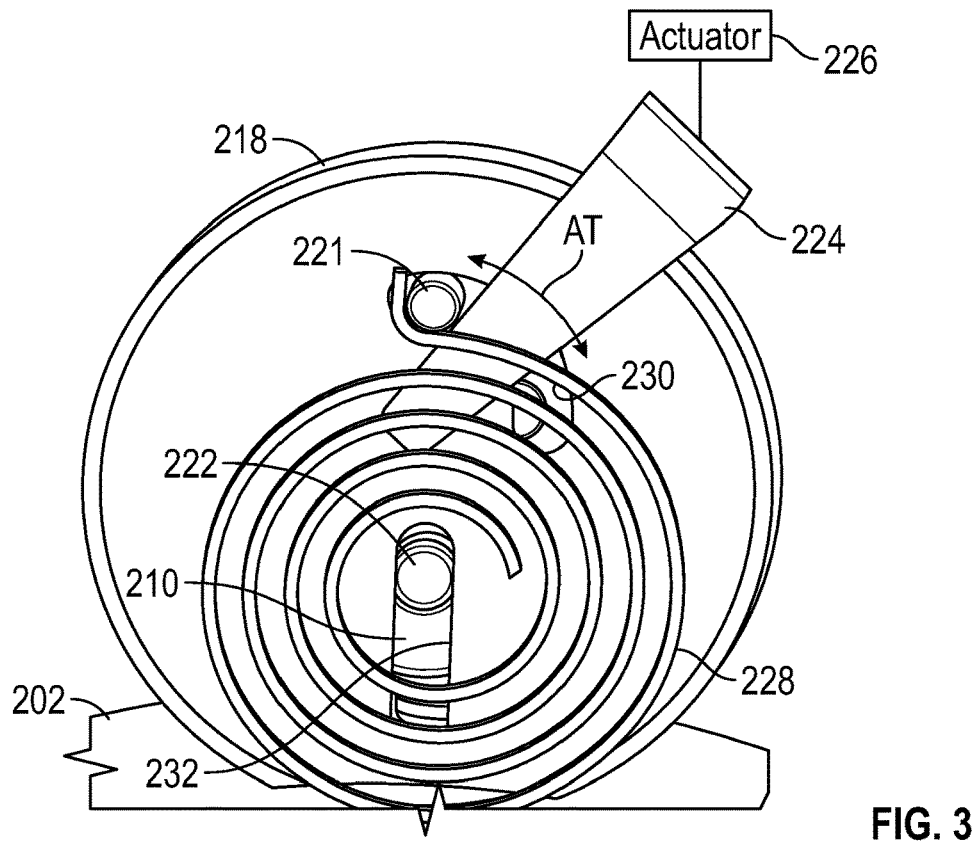
FIG. 3 is a schematic isometric, rear view of part of the shift by wire parking system shown in FIG. 2, wherein the shift by wire parking system is in an out of park position.
Figure 4:
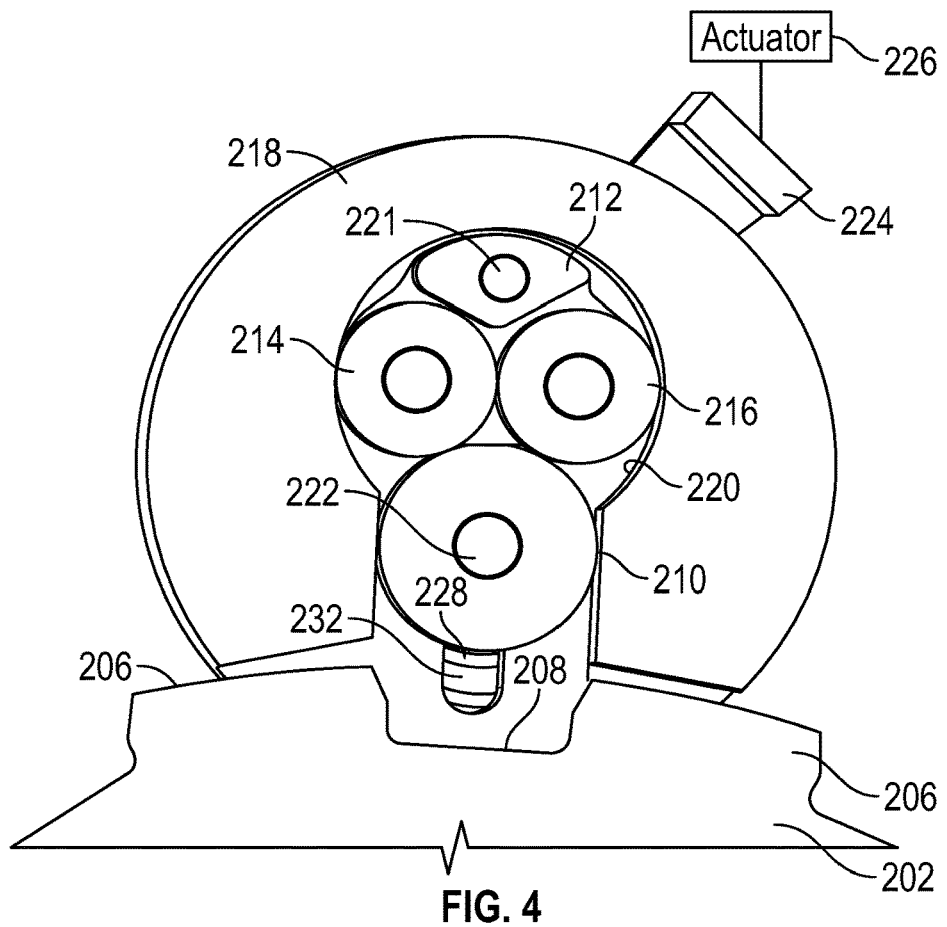
FIG. 4 is a schematic isometric, front view of part of the shift by wire parking system shown in FIG. 2, wherein the shift by wire parking system is in the out of park position.
Figure 5:
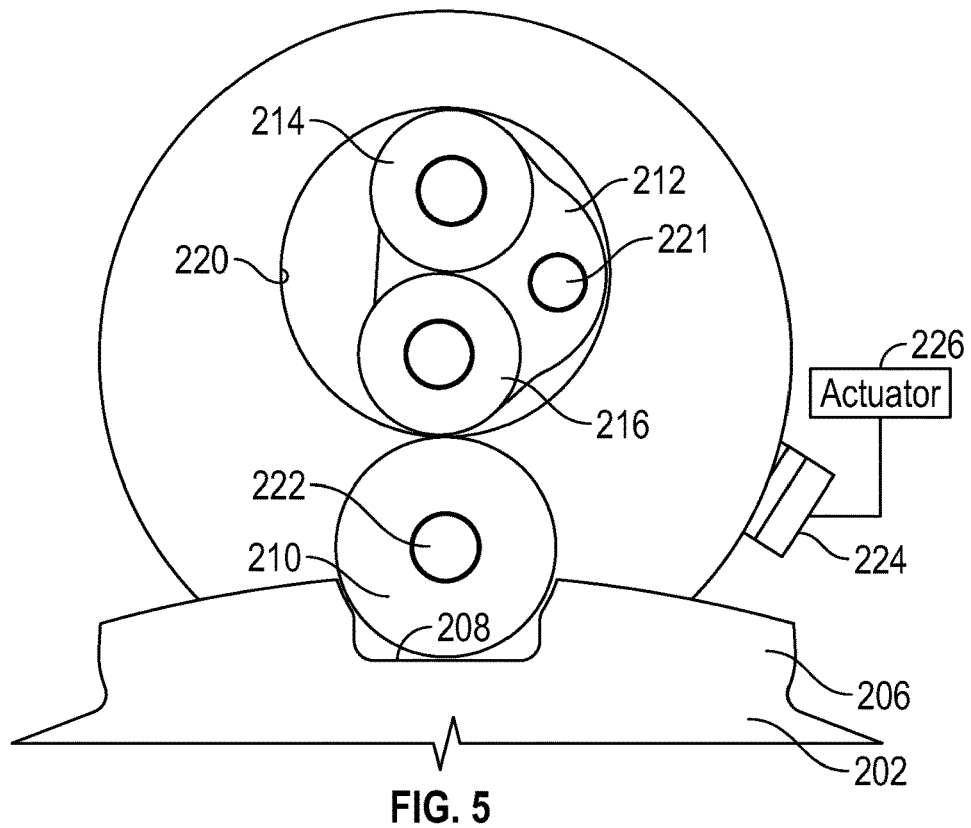
FIG. 5 is a schematic front view of part of the shift by wire parking system shown in FIG. 2, wherein the shift by wire parking system is in the park position.
Figure 6:
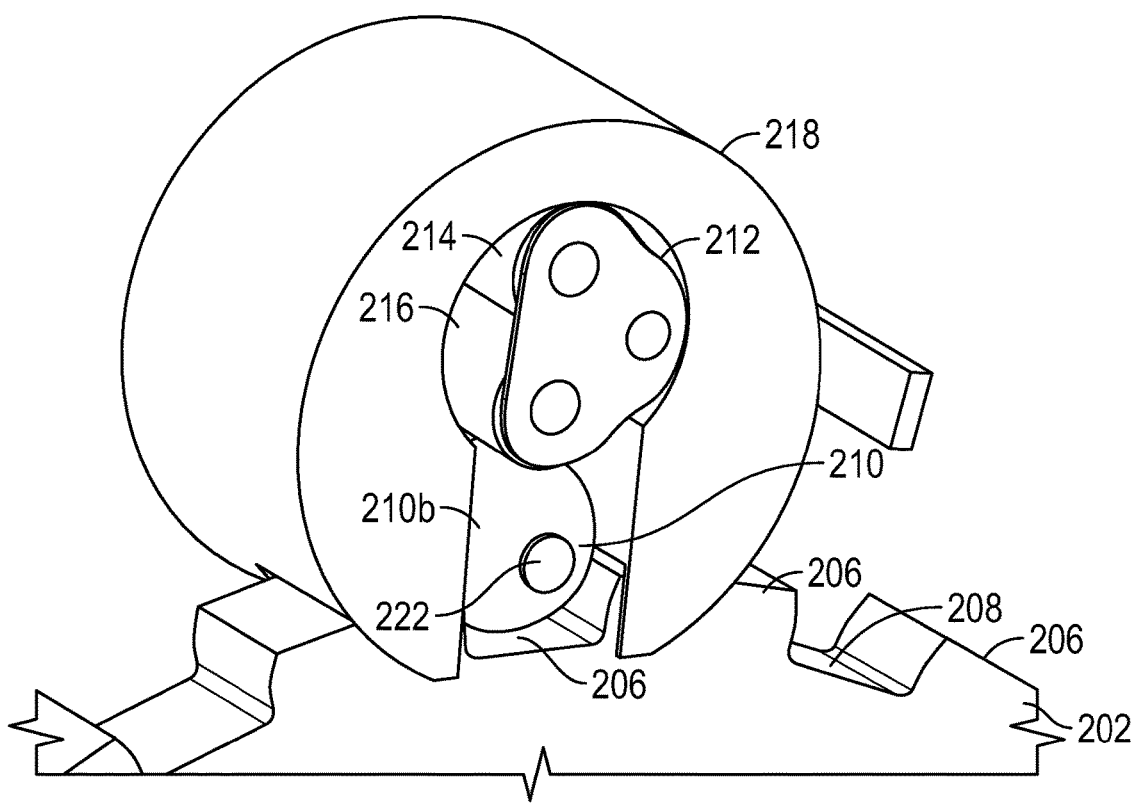
FIG. 6 is a schematic isometric view of a shift by wire parking system having a ball.

The shift by wire parking system 200 further includes a circumferential body 210. In the present disclosure, the term "circumferential body" means an engagement roller 210a (as shown in FIG. 2) or a spherical ball 210b (as shown in FIG. 6). The engagement roller 210a is configured to rotate along the teeth 206 of the park gear 202. The ball 210b is also configured to rotate along the teeth 206 of the park gear 202. The circumferential body 210 is sized to fit inside each of the void spaces 208. In other words, the circumferential body 210 is sized to tightly fit inside one of the void spaces 208 to lock the position of the park gear 202, thereby preventing the park gear 202 from rotating about the gear axis XG. As a consequence, the shift by wire parking system 200 is in the park position, thereby preventing the vehicle system 5 from moving. The circumferential body 210 is movable towards and away from the park gear 202 between an engaged position (FIGS. 2 and 5) and a disengaged position (FIGS. 3 and 4). In the disengaged position, the circumferential body 210 is disposed outside each of the void spaces 208, thereby allowing the park gear 202 to rotate about the gear axis XG. In engaged position, the circumferential body 210 is disposed inside one of void spaces 208 to lock the position of the park gear 202, thereby preventing the park gear 202 from rotating about the gear axis XG.

The shift by wire parking system 200 further includes a rotatable plate 212, a first intermediate roller 214 and a second intermediate roller 216. Each of the first intermediate roller 214 and the second intermediate roller 216 is rotatably coupled to the rotatable plate 212 to allow each of the first intermediate roller 214 and the second intermediate roller 216 to rotate relative to the rotatable plate 212. Each of the first intermediate roller 214 and the second intermediate roller 216 is configured to directly contact the circumferential body 210 to allow the rotation of the circumferential body 210 to cause either the first intermediate roller 214 or the second intermediate roller 216 to rotate. The rotatable plate 212 is configured to rotate to allow either the first intermediate roller 214 or the second intermediate roller 216 to move towards and away from the park gear 202.

The shift by wire parking system 200 further includes an assembly housing 218 defining a cavity 220. The rotatable plate 212, the first intermediate roller 214, and the second intermediate roller 216 are entirely disposed inside the cavity 220 of the assembly housing 218 when the circumferential body 210 is in the disengaged position. The circumferential body 210 is partially disposed outside the cavity 220 when disposed in the engaged position.

The shift by wire parking system 200 further includes an engagement pin 221 directly coupled to the rotatable plate 212 to enhance their structural integrity. The engagement pin 221 is movable between a locked pin position (FIGS. 2 and 5) and an unlocked pin position (FIGS. 3 and 4). Moving the engagement pin 221 from the unlocked pin position to the locked pin position causes the rotatable plate 212 to move. As a consequence, the first intermediate roller 214 moves toward the park gear 202, thereby moving the circumferential body 210 to the engaged position to lock the position of the park gear 202.

The shift by wire parking system 200 further includes a lever 224 in direct contact with the engagement pin 221. The lever 224 is movable between an unlocked lever position (FIGS. 3 and 4) and a locked lever position (FIGS. 2 and 5). Moving the lever 224 from the unlocked lever position to the locked lever position causes the engagement pin 221 to move from the unlocked pin position to the locked position. The shift by wire parking system 200 further includes an actuator 226 coupled to the lever 224 to move the lever 224 between the unlocked lever position and the locked lever position. The actuator 226 may be a pneumatic actuator, a hydraulic actuator, an electric actuator and/or a combination thereof. When the actuator 226 is turned on, the lever 224 is held in the unlocked lever position in order to maintain the shift by wire parking system in the out of park position. When the actuator 226 is turned off, the park spring 228 biases the engagement pin 221 toward locked pin position, thereby shifting the shift by wire parking system 200 to the park position. Therefore, when the actuator 226 is turned off, the park spring 228 holds the shift by wire parking system 200 in the park position. Therefore, the park position of the shift by wire parking system is in the default position.

The shift by wire parking system 200 further includes a park spring 228 in direct contact with the engagement pin 221 to bias the engagement pin 221 towards the locked pin position. Moving the lever 224 from the locked lever position towards the unlocked lever position compresses the park spring 228. As a result, the park spring 228 allows the park position of the shift by wire parking system 200 to be the default position. The shift by wire parking system 200 may have park springs 228 on the rear and front sides of the assembly housing 218.

The assembly housing 218 defines an arc-shaped slot 230 (FIG. 3). The engagement pin 221 is partially disposed inside the arc-shaped slot 230. The arc-shaped slot 230 is configured to guide the movement of the engagement pin 221 between the unlocked pin position and the locked pin position. As a consequence, the engagement pin 221 moves along an arc trajectory AT between the unlocked pin position and the locked pin position.

The shift by wire parking system 200 further includes movable pin 222 directly coupled to the circumferential body 210 to enhance their structural integrity. The assembly housing 218 defines an elongated slot 232. The movable pin 222 is partially disposed inside the elongated slot 232 to allow the circumferential body 210 to move linearly toward and away from the park gear 202 between the disengaged position and the engaged position.

With reference to FIG. 6, the circumferential body 210 may be a ball 210b. The ball 210b has a spherical shape to facilitate rotation along the teeth 206 of the park gear 202.

Figure 7:
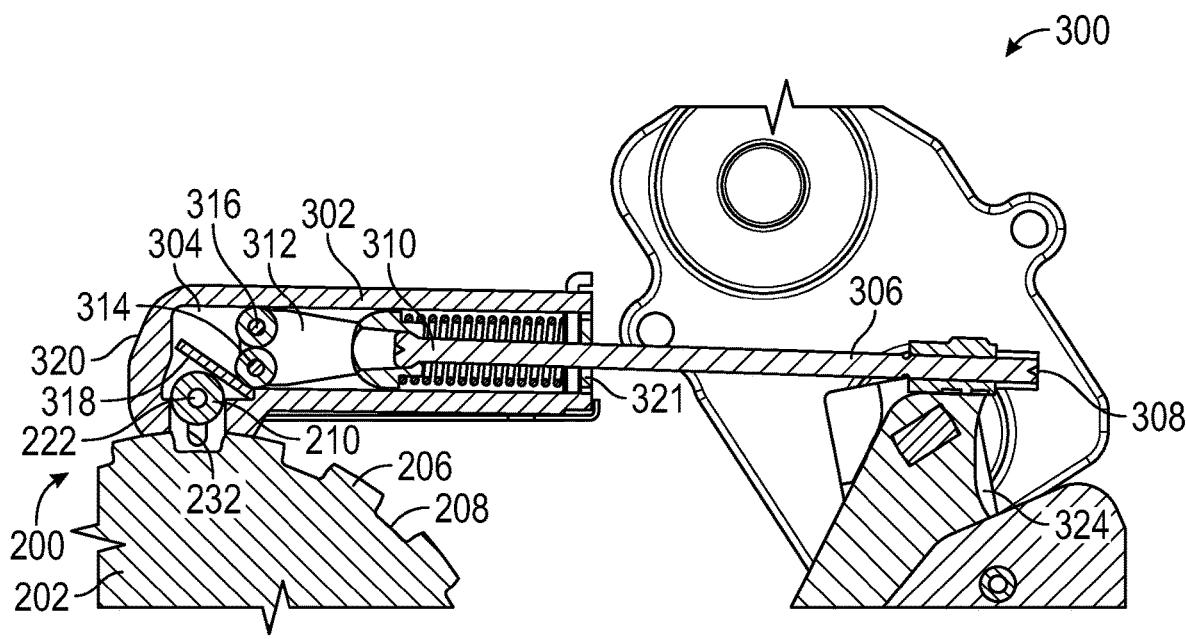
FIG. 7 is a schematic front view of a shift by wire parking system including a circumferential body and an actuator assembly coupled to the circumferential body.
Figure 8:
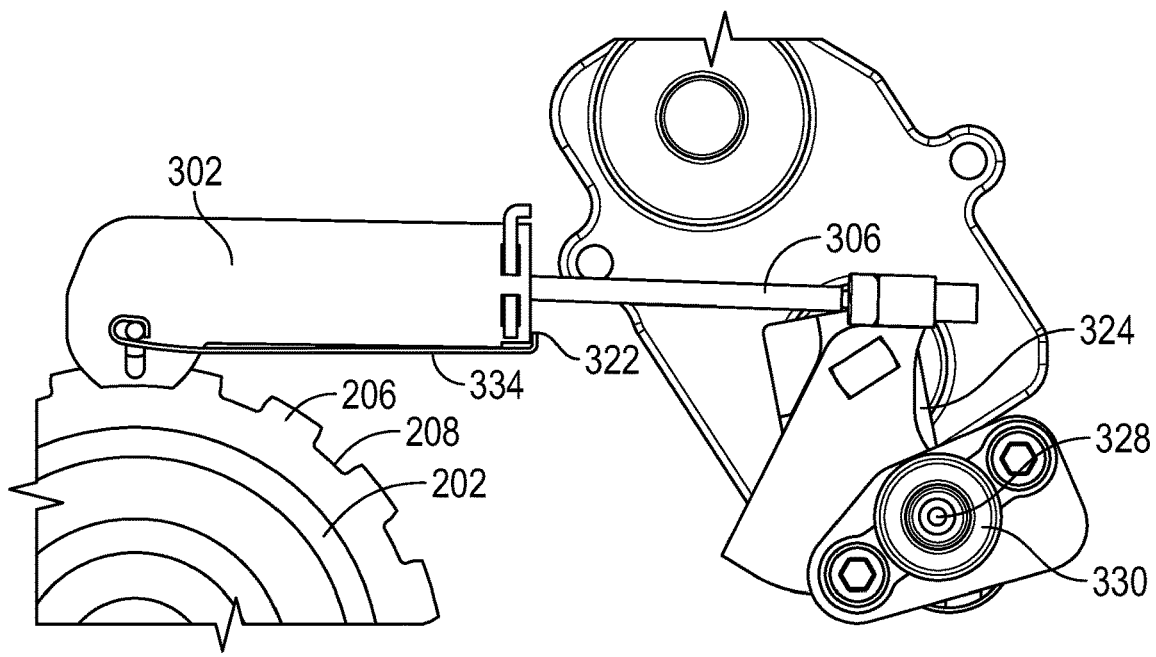
FIG. 8 is a schematic rear view of the shift by wire parking system shown in FIG. 7.
Figure 9:
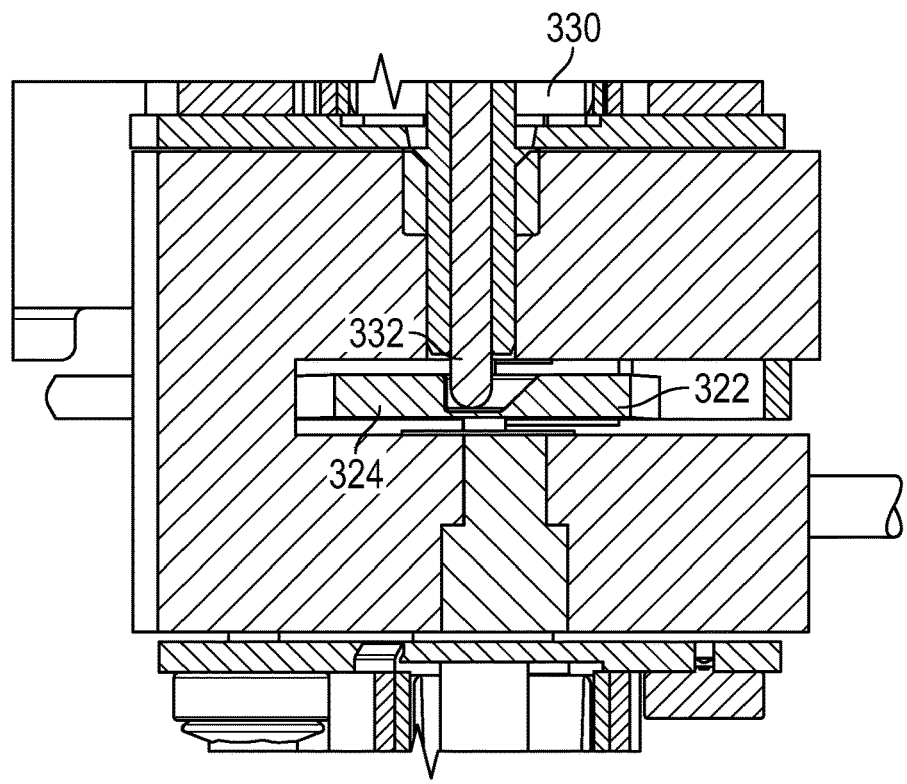
FIG. 9 is a schematic sectional view of the shift by wire parking system shown in FIG. 7, wherein the shift by wire parking system includes a latching solenoid holding the shift by wire parking system in the out of park position.
Figure 10:
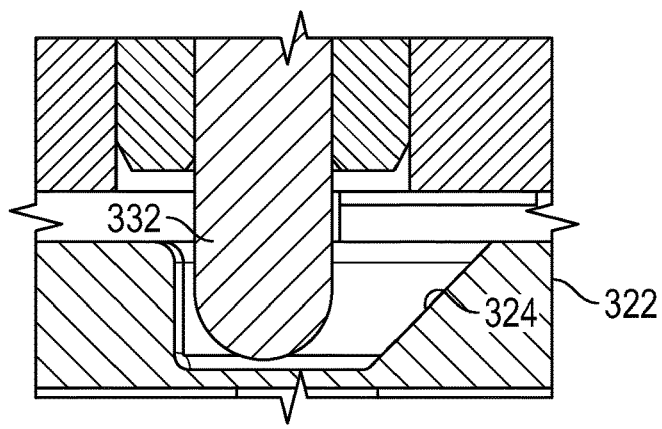
FIG. 10 is an enlarged, schematic sectional enlarged view of the shift by wire parking system, wherein the shift by wire parking system includes a latching solenoid holding the shift by wire parking system in the out of park position.
Figure 11:
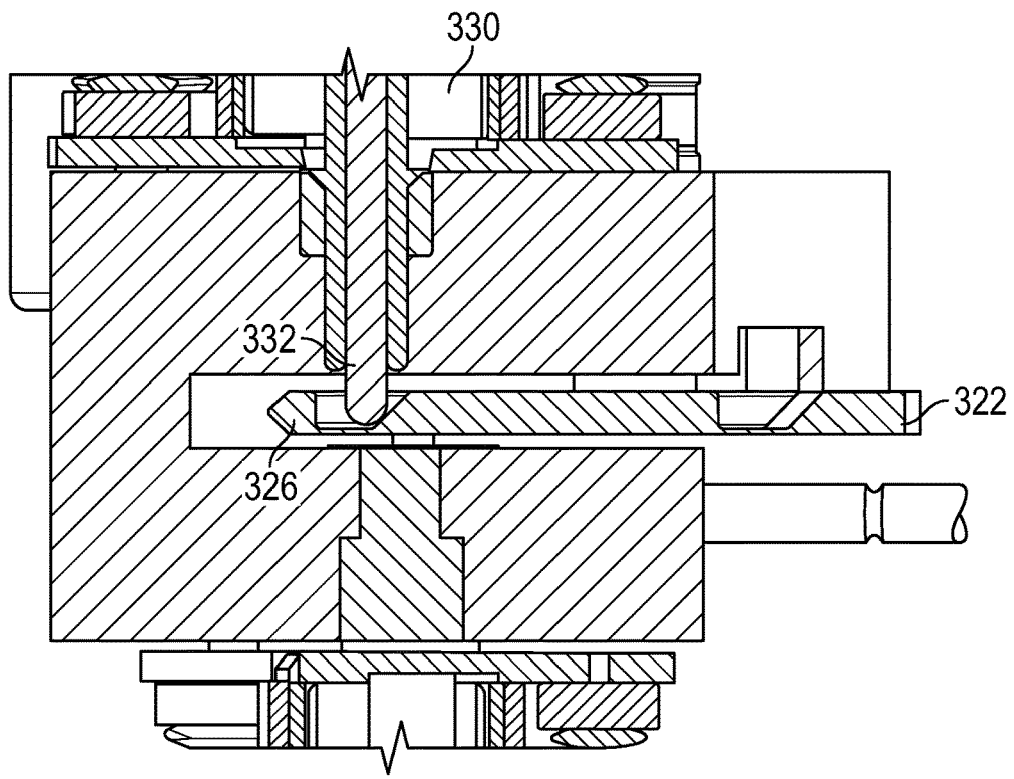
FIG. 11 is schematic sectional view of the shift by wire parking system shown in FIG. 7, wherein the shift by wire parking system includes a latching solenoid holding the shift by wire parking system in the park position.
Figure 12:
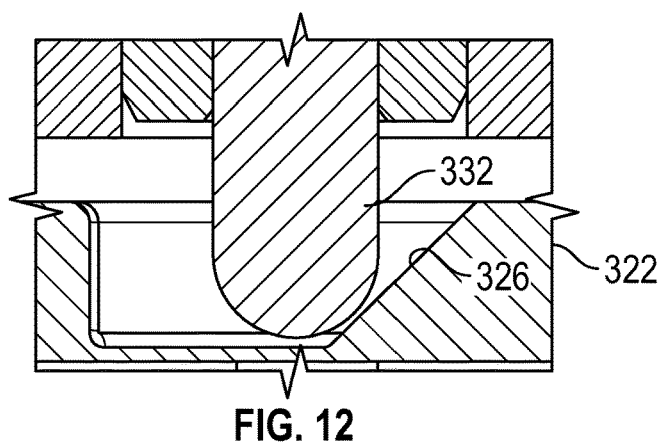
FIG. 12 is an enlarged, schematic sectional view of the shift by wire parking system shown in FIG. 7, wherein the shift by wire parking system includes a latching solenoid holding shift by wire parking system is in the park position.

With reference to FIGS. 6 and 7, the shift by wire parking system 200 includes an actuation assembly 300. The actuation assembly 300 includes an actuator guide 302 defining a cavity 304. Further, the actuation assembly 300 includes an actuator rod 306 partly disposed inside the cavity 304. The actuator rod 306 is configured to translate along the cavity 304. The actuator rod 306 defines a first rod end 308 and a second rod end 310 opposite the first rod end 308. The actuation assembly 300 includes a roller support 312 coupled at the second rod end 310. The roller support 312 is disposed in the cavity 304 of the actuator guide 302. The actuator guide 302 is fixed to the transmission housing. The roller support 312 is configured to translate through the cavity 304 of the actuator guide 302 upon translation of the actuator rod 306. The actuation assembly 300 includes a first driving roller 314 and second driving roller 316 each coupled to the roller support 312. Each of the first driving roller 314 and the second driving roller 316 is configured to translate through the cavity 304 of the actuator guide 302 upon translation of the roller support 312.

The actuation assembly 300 includes a ramp 318 pivotally coupled to the actuator guide 302 inside the cavity 304. The ramp 318 is configured to pivot to push the circumferential body 210 from the disengaged position toward the engaged position upon translation of the actuator rod 306, the roller support 312, the first driving roller 314, and the second driving roller 316 through the cavity 304 of the actuator guide 302. The actuator guide 302 has a front wall 320 and rear wall 321 opposite the front wall 320. The shift by wire parking system 200 further includes a rod spring mounted on the actuator rod between the rear wall of the case and the roller support to bias the roller support toward the circumferential body 210. The actuator assembly 300 includes a detent plate 322 coupled to the actuator rod 306. The detent plate 322 defines a first notch 324 and a second notch 326 spaced apart from each other. The shift by wire parking system 200 further includes a latching solenoid 328 including a solenoid housing 330 and solenoid shaft 332 linearly movable relative to the solenoid housing 330 between a retracted position and the extended position. The solenoid shaft 332 is configured to move toward and away from the detent plate 322. The solenoid shaft 332 is partly disposed inside the first notch 324 to lock the circumferential body 210 in the engaged position. The solenoid shaft 332 is partly disposed inside the second notch 326 to lock the circumferential body 210 in the disengaged position. The actuation assembly 300 further includes a return spring 334 coupled between the rear wall 321 and the movable pin 222 to bias the movable pin 222 toward the park gear 202. When the latching solenoid 328 latches in the out of park position against a ninety-degree ramp, there is no contact force acting on the solenoid shaft 332. The latching solenoid 328 present an unintended roller extraction. When energized, the latching solenoid 328 is in the out of park position against the ramp defined second notch 326.

The detailed description and the drawings or figures are exemplary of the description of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A shift by wire parking system, comprising:
    a park gear including a gear body and a circumferentially spaced plurality of teeth protruding from the gear body, the park gear defines a plurality of void spaces between each pair of the plurality of teeth;
    a circumferential body sized to fit inside each of the plurality of void spaces to lock a position of the park gear, wherein the circumferential body is movable towards and away from the park gear between an engaged position and a disengaged position;
    wherein, in the disengaged position, the circumferential body is disposed outside each of the plurality of void spaces, thereby allowing the park gear to rotate; and
    wherein, in the engaged position, the circumferential body is disposed inside one of the plurality of void spaces to lock the position of the park gear;
    wherein the shift by wire parking system further includes a rotatable plate and a first intermediate roller rotatable coupled to the rotatable plate, and the rotatable plate is configured to rotate to allow the first intermediate roller to move towards and away from the park gear; and
    wherein the shift by wire parking system further includes a second intermediate roller rotatably coupled to the rotatable plate to allow the second intermediate roller to rotate relative to the rotatable plate.

2. The shift by wire parking system of claim 1, further comprising an engagement pin directly coupled to the circumferential body, wherein the engagement pin is movable between a locked pin position and an unlocked pin position, wherein moving the engagement pin from the unlocked pin position to the locked pin position causes the first intermediate roller to move toward the park gear, thereby moving the circumferential body to the engaged position to lock the position of the park gear.

3. The shift by wire parking system of claim 2, further comprising a lever in direct contact with the engagement pin, wherein the lever is movable between an unlocked lever position and a locked lever position, and moving the lever from the unlocked lever position to the locked lever position causes the engagement pin to move from the unlocked pin position to the locked pin position.

4. The shift by wire parking system of claim 3, further comprising a park spring in direct contact with the engagement pin to bias the engagement pin towards the locked pin position, wherein moving the lever from the locked lever position toward the unlocked lever position compresses the park spring.

5. The shift by wire parking system of claim 4, further comprising an assembly housing defining a cavity, wherein the rotatable plate, the first intermediate roller, and the second intermediate roller are entirely disposed inside the cavity of the assembly housing when the circumferential body is in the disengaged position, and the circumferential body is partially disposed outside the cavity when disposed in the engaged position.

6. The shift by wire parking system of claim 5, wherein the assembly housing defines an arc-shaped slot, the engagement pin is partially disposed inside the arc-shaped slot, the arc-shaped slot is configured to guide a movement of the engagement pin between the unlocked pin position and the locked pin position, thereby allowing the engagement pin to move along an arc trajectory between the unlocked pin position and the locked pin position.

7. The shift by wire parking system of claim 6, further comprising a movable pin directly coupled to the circumferential body, wherein the assembly housing defines an elongated slot, the movable pin is partially disposed inside the elongated slot to allow the circumferential body to move linearly toward and away from the park gear between the disengaged position and the engaged position.

8. The shift by wire parking system of claim 7, further comprising an actuator coupled to the lever to move the lever between the unlocked lever position and the locked lever position.

9. The shift by wire parking system of claim 1, wherein the circumferential body is an engagement roller configured to rotate along the plurality of teeth of the park gear.

10. The shift by wire parking system of claim 1, wherein the circumferential body is a spherical ball configured to rotate along the plurality of teeth of the park gear.

11. The shift by wire parking system of claim 1, further comprising an actuation assembly, wherein the actuation assembly includes:
    an actuator guide defining a cavity;
    an actuator rod partly disposed inside the cavity, wherein the actuator rod is configured to translate along the cavity, and the actuator rod defines a first rod end and a second rod end opposite the first rod end;

a roller support coupled at the second rod end, wherein the roller support is disposed in the cavity of the actuator guide, and the roller support is configured to translate through the cavity of the actuator guide upon translation of the actuator rod;

a driving roller coupled to the roller support, wherein the driving roller is configured to translate through the cavity of the actuator guide upon translation of the roller support; and a ramp pivotally coupled to the actuator guide inside the cavity, wherein the ramp is configured to pivot to push the circumferential body from the disengaged position toward the engaged position upon translation of the actuator rod, the roller support, and the driving roller through the cavity of the actuator guide.

12. The shift by wire parking system of claim 11, wherein the actuator guide has a front wall and rear wall opposite the front wall, the shift by wire parking system further includes a rod spring mounted on the actuator rod between the rear wall of the actuator guide and the roller support to bias the roller support toward the circumferential body.

13. The shift by wire parking system of claim 12, further comprising:

a detent plate coupled to the actuator rod, wherein the detent plate defines a first notch and a second notch spaced apart from each other;

a latching solenoid including a solenoid housing and solenoid shaft linearly movable relative to the solenoid housing between a retracted position and an extended position, wherein the solenoid shaft is configured to move toward and away from the detent plate;

wherein the solenoid shaft is partly disposed inside the first notch to lock the circumferential body in the engaged position; and wherein the solenoid shaft is partly disposed inside the second notch to lock the circumferential body in the disengaged position.

14. A vehicle system, comprising:

a prime mover;

a transmission including a transmission housing, a transmission input shaft disposed inside the transmission housing, a transmission output shaft disposed inside the transmission housing, and a shift by wire parking system disposed inside the transmission housing, wherein the transmission input shaft is coupled to the prime mover, and the shift by wire parking system includes:

a park gear including a gear body and a circumferentially spaced plurality of teeth protruding from the gear body, the park gear defines a plurality of void spaces between each pair of the plurality of teeth;

a circumferential body sized to fit inside each of the plurality of void spaces to lock a position of the park gear, wherein the circumferential body is movable towards and away from the park gear between an engaged position and a disengaged position;

wherein, in the disengaged position, the circumferential body is disposed outside each of the plurality of void spaces, thereby allowing the park gear to rotate; and wherein, in the engaged position, the circumferential body is disposed inside one of the plurality of void spaces to lock the position of the park gear, wherein the shift by wire parking system further includes a rotatable plate and a first intermediate roller rotatably coupled to the rotatable plate to allow the first intermediate roller to rotate relative to the rotatable plate, wherein the intermediate roller is configured to contact the circumferential body to allow a rotation of the circumferential body, and the rotatable plate is configured to rotate to allow the first intermediate roller to move towards and away from the park gear, the shift by wire system further includes a second intermediate roller rotatably coupled to the rotatable plate to allow the second intermediate roller to rotate relative to the rotatable plate.

15. The vehicle system of claim 14, wherein the shift by wire parking system further includes an engagement pin directly coupled to the rotatable plate, wherein the engagement pin is movable between a locked pin position and an unlocked pin position, wherein moving the engagement pin from the unlocked pin position to the locked pin position causes the first intermediate roller to move toward the park gear, thereby moving the circumferential body to the engaged position to lock the position of the park gear.

16. The vehicle system of claim 15, wherein the shift by wire parking system further includes a lever in direct contact with the engagement pin, wherein the lever is movable between an unlocked lever position and a locked lever position, and moving the lever from the unlocked lever position to the locked lever position causes the engagement pin to move from the unlocked pin position to the locked pin position, wherein shift by wire parking system further includes a park spring in direct contact with the engagement pin to bias the engagement pin towards the locked pin position, wherein moving the lever from the locked lever position toward the unlocked lever position compresses the park spring.

17. The vehicle system of claim 16, further comprising an assembly housing defining a cavity, wherein the rotatable plate, the first intermediate roller, and the second intermediate roller are entirely disposed inside the cavity of the assembly housing when the circumferential body is in the disengaged position, and the circumferential body is partially disposed outside the cavity when disposed in the engaged position.

* * * * *